(12) United States Patent
Kim et al.

(10) Patent No.: US 9,545,668 B2
(45) Date of Patent: Jan. 17, 2017

(54) FINE METAL PARTICLE-CONTAINING COMPOSITION

(75) Inventors: Insoo Kim, Busan (KR); Chang-Gun Lee, Jinju-shi (KR); Tomoki Kitafuji, Ono (JP)

(73) Assignee: TOKUSEN KOGYO CO., LTD., Ono, Hyogo (JP)

( * ) Notice: Subject to any disclaimer, the term of this patent is extended or adjusted under 35 U.S.C. 154(b) by 595 days.

(21) Appl. No.: 13/511,424

(22) PCT Filed: Oct. 12, 2010

(86) PCT No.: PCT/JP2010/067858
§ 371 (c)(1),
(2), (4) Date: May 23, 2012

(87) PCT Pub. No.: WO2011/065135
PCT Pub. Date: Jun. 3, 2011

(65) Prior Publication Data
US 2012/0280187 A1    Nov. 8, 2012

(30) Foreign Application Priority Data

Nov. 27, 2009 (JP) .................................. 2009-269564
Sep. 28, 2010 (JP) .................................. 2010-217236

(51) Int. Cl.
*C07F 1/10* (2006.01)
*H01B 1/02* (2006.01)
(Continued)

(52) U.S. Cl.
CPC ........... *B22F 1/0062* (2013.01); *B22F 1/0018* (2013.01); *B22F 1/0059* (2013.01); *B22F 1/0081* (2013.01);
(Continued)

(58) Field of Classification Search
USPC ................... 252/512, 514; 548/402; 556/110
See application file for complete search history.

(56) References Cited

U.S. PATENT DOCUMENTS 5,658,499 A * 8/1997 Steinberg ................. C09D 5/24
106/1.14
6,190,731 B1 * 2/2001 Tecle ....................... B01J 2/006
427/213.3
(Continued)

FOREIGN PATENT DOCUMENTS

JP    10-183207     7/1998
JP   2004-043892    2/2004
(Continued)

OTHER PUBLICATIONS

Chemical data sheet for Dipropylene Glycol Monoethyl Ether. Accessed online at http://www.chemicalland21.com/industrialchem/solalc/DIPROPYLENE%20GLYCOL%20MONOMETHYL%20ETHER.htm ; the Internet Archive Wayback Machine shows that this was available online on Nov. 29, 2007; a copy of which accompanies this office action as a PDF.*

(Continued)

*Primary Examiner* — Harold Pyon
*Assistant Examiner* — Katie L Hammer
(74) *Attorney, Agent, or Firm* — Dickinson Wright PLLC

(57) ABSTRACT

A fine silver particle-containing composition includes a large number of fine silver particles 2 and a coating layer 4 that covers a surface of each silver particle 2. The silver particle 2 is a so-called nano particle. The silver particle 2 has a scale-like shape. The coating layer 4 consists of an organic compound. The organic compound binds to the silver particle 2. The organic compound suppresses aggregation of the silver particle 2. The composition is in a cake form. A weight ratio of the organic compound with regard to (Continued)

the total amount of the composition is not lower than 2% but not higher than 15%.

5 Claims, 2 Drawing Sheets

(51) Int. Cl.
*B22F 1/00* (2006.01)
*B22F 1/02* (2006.01)
*B22F 9/26* (2006.01)
*B82Y 30/00* (2011.01)
*H01B 1/22* (2006.01)

(52) U.S. Cl.
CPC . *B22F 1/02* (2013.01); *B22F 9/26* (2013.01); *B82Y 30/00* (2013.01); *H01B 1/02* (2013.01); *H01B 1/22* (2013.01); *B22F 2001/0033* (2013.01); *Y10T 428/2991* (2015.01)

(56) References Cited

U.S. PATENT DOCUMENTS

| | | | |
|---|---|---|---|
| 6,358,611 B1 | 3/2002 | Nagasawa et al. | |
| 6,730,400 B1* | 5/2004 | Komatsu et al. | 428/403 |
| 6,743,395 B2* | 6/2004 | Fukunaga et al. | 419/23 |
| 6,986,943 B1* | 1/2006 | Cook | B01J 2/30 |
| | | | 427/214 |
| 2002/0018896 A1 | 2/2002 | Fukunaga et al. | |
| 2003/0151030 A1* | 8/2003 | Gurin | B82Y 10/00 |
| | | | 252/502 |
| 2004/0173666 A1 | 9/2004 | Fukunaga et al. | |
| 2005/0285084 A1* | 12/2005 | Fujii | C09D 11/30 |
| | | | 252/500 |
| 2006/0099539 A1* | 5/2006 | Ito | G03C 1/005 |
| | | | 430/567 |
| 2007/0290175 A1* | 12/2007 | Kim | B22F 1/0018 |
| | | | 252/500 |
| 2008/0105085 A1 | 5/2008 | Kim et al. | |
| 2009/0146117 A1* | 6/2009 | Suenaga | B22F 1/0062 |
| | | | 252/520.3 |
| 2010/0006002 A1 | 1/2010 | Sato et al. | |
| 2010/0279006 A1* | 11/2010 | Sato | B22F 1/0062 |
| | | | 427/216 |
| 2011/0253949 A1* | 10/2011 | Kaneda | B22F 1/0014 |
| | | | 252/514 |

FOREIGN PATENT DOCUMENTS

| | | |
|---|---|---|
| JP | 2007-095527 | 4/2007 |
| JP | 2008-517153 | 5/2008 |
| JP | 2008-190025 | 8/2008 |
| JP | 2008-258147 | 10/2008 |
| JP | 2009-013443 | 1/2009 |
| WO | 01/70435 | 9/2001 |

OTHER PUBLICATIONS

International Search Report for PCT/JP2010/067858, dated Jan. 18, 2011.

Office Action dated Sep. 20, 2011, from the Japanese Patent Office in corresponding Japanese Application No. 2010-230275.

* cited by examiner

FINE METAL PARTICLE-CONTAINING COMPOSITION

TECHNICAL FIELD

The present invention relates to a fine metal particle-containing composition, a method for manufacturing the same, and a method for using the same.

BACKGROUND ART

When manufacturing a printed circuit board of an electronic device, patterns that connect elements are printed. A conductive paste is used for the printing. The conductive paste contains a fine metal particle, a binder, and a liquid organic compound (solvent). An excellent printing characteristic is necessary for the conductive paste. Excellent conductivity is also necessary for the conductive paste. In order to obtain such characteristics, extremely small particles (i.e., nano particles) are used in the conductive paste.

A representative metal particle is a silver particle. JP-A-2008-517153 discloses a manufacturing method for obtaining fine silver particles from silver oxalate.

CITATION LIST

Patent Literature

Patent Literature 1: JP-A-2008-517153

SUMMARY OF THE INVENTION

Problems to be Solved by the Invention

Metal particles are fine, and therefore are difficult to handle. Productivity of the conductive paste is not sufficient.

Fine metal particles can easily aggregate. Metal particles that have aggregated need to be re-dispersed when used for manufacturing a paste. This re-dispersion cannot be conducted easily. The aggregation impairs a quality of the conductive paste.

An object of the present invention is to improve handleability of fine metal particles. Another object of the present invention is to prevent aggregation of the fine metal particles.

Solution to the Problems

A fine metal particle-containing composition according to the present invention contains a large number of fine metal particles, and an organic compound that coats a surface of each particle. A weight ratio of the organic compound with regard to the total amount of the composition is not lower than 2% but not higher than 15%.

Preferably, a material of the particle is silver. Preferably, the organic compound is bound on the surface of the particle. Preferably, the particle has a scale-like shape.

A method for manufacturing the fine silver particle-containing composition according to the present invention includes the steps of:

dispersing a silver compound in a carrier that is a liquid to obtain a dispersion liquid;

precipitating, in the dispersion liquid, a fine silver particle having a first organic compound bound on a surface thereof;

separating the silver particle from the carrier;

adding the silver particle to a liquid of a second organic compound to bind the second organic compound to a surface of the silver particle; and separating the silver particle from the liquid of the second organic compound.

A method for using the fine particle-containing composition according to the present invention includes the steps of:

preparing the fine particle-containing composition that includes a large number fine particles and an organic compound that coats a surface of each particle, such that a weight ratio of the organic compound with regard to a total amount of the composition is not lower than 2% but not higher than 15%; and mixing the composition and a solvent that has a high affinity with the organic compound to obtain a paste.

Advantageous Effects of the Invention

In the composition according to the present invention, metal particles are dispersed inside a matrix of the organic compound. Therefore, even though the metal particles are fine, the composition has excellent handleability. The organic compound also suppresses aggregation of the particles.

DESCRIPTION OF EMBODIMENTS

In the following, with reference to the drawings as appropriate, details of the present invention will be described based on preferable embodiments.

Figure 1:
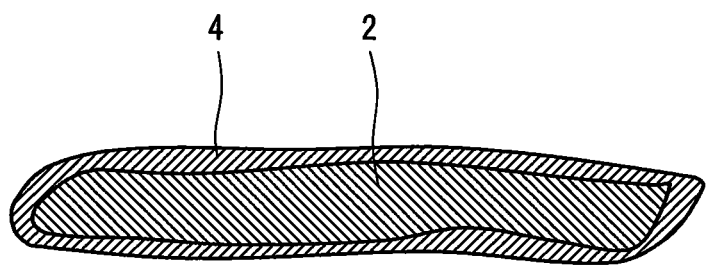
FIG. 1 is a cross sectional view showing a silver particle and an organic compound included in a composition according to one embodiment of the present invention.
Figure 2:
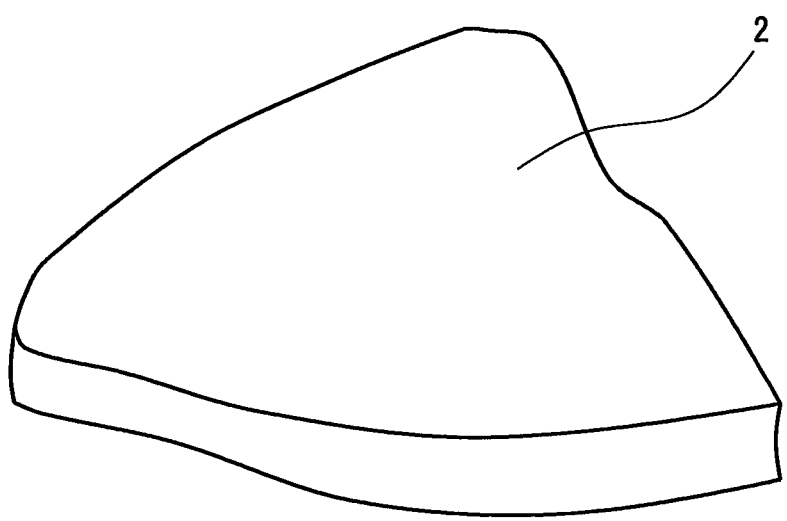
FIG. 2 is a perspective view showing the silver particle in FIG. 1.

FIG. 1 shows a fine silver particle 2. As shown in FIG. 2, the silver particle 2 has a scale-like shape. The size of the silver particle 2 is not smaller than 200 nm but not larger than 10 μm. The silver particle 2 is a so-called nano particle.

In FIG. 1, a coating layer 4 is also shown together with the silver particle 2. The silver particle 2 is covered with the coating layer 4. The coating layer 4 consists of an organic compound. The organic compound by itself is a liquid under normal temperature and normal pressure.

Preferably, a composition containing a large number of the silver particles 2 and the organic compound is in a cake form. Here, a cake form refers to a state between a paste and powder. Therefore, a fluidity of the composition is lower than a fluidity of a paste. The composition does not scatter as in the case with powder. Even though the silver particle 2 is fine in terms of a size thereof, the composition has excellent handleability. It should be noted that the composition may be in a state of a paste.

The organic compound exists between the silver particle 2 and other silver particles 2. The organic compound suppresses aggregation of the silver particles 2.

A representative use application of the composition is as a material for a conductive paste. The conductive paste is obtained by adding a solvent, a binder, a dispersant, and the like to the composition. Since the silver particles 2 do not aggregate in the composition, the silver particles 2 are sufficiently dispersed also in the conductive paste. Therefore, the paste has excellent conductivity and printing characteristic. When manufacturing the conductive paste, it is unnecessary to use a special device for re-dispersing aggregated particles.

A weight ratio of the organic compound with regard to the total amount of the composition is not lower than 2%. In the composition, aggregation hardly occurs. From this standpoint, the ratio is preferably not lower than 4%, and is particularly preferably not lower than 5%. When the organic compound exists in an excessive amount, a degree of freedom for adjusting components in the conductive paste is hampered. From this standpoint, the ratio is preferably not higher than 15%.

In the following, one example of a method for manufacturing the composition is described. In the manufacturing method, a silver compound is dispersed in a carrier which is a liquid. A representative silver compound is silver oxalate. Silver oxalate can be obtained through a reaction of a solution of a silver compound and an oxalate compound. A representative silver compound is silver nitrate ($AgNO_3$). Examples of the oxalate compound include oxalic acid and sodium oxalate. Impurities are removed from a precipitate obtained from the reaction to obtain a powder of silver oxalate.

A hydrophilic liquid is used as the carrier. Specific examples of the carrier include water and alcohol. Preferable alcohols include ethyl alcohol, methyl alcohol, and propyl alcohol. Two or more types of liquids may be used as the carrier.

In essence, silver oxalate does not dissolve in the carrier. Silver oxalate is dispersed in the carrier. The dispersion can be enhanced through an ultrasonic-wave treatment.

An obtained dispersion liquid is heated. As a result of the heating, a reaction shown in the following formula occurs. In other words, silver oxalate resolves by heat.

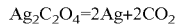

$$Ag_2C_2O_4 = 2Ag + 2CO_2$$

Silver is precipitated as fine particles in the dispersion liquid.

An organic compound (hereinafter, referred to as a "first organic compound") derived from silver oxalate or the carrier binds to the surface of the silver particle 2. The first organic compound binds with the silver particle 2, chemically.

The silver particles 2 is placed in a centrifuge. The carrier is removed from the silver particle 2 using the centrifuge. If necessary, another liquid may be added to the silver particle 2, and an obtained mixture may be placed in the centrifuge again. The carrier can be almost completely removed from the silver particle 2 by using another liquid.

The silver particle 2 is added to a liquid of another organic compound (hereinafter, referred to as a "second organic compound"). With this addition, the second organic compound binds to the first organic compound through surface tension and the like. In other words, the second organic compound binds to the surface of the silver particle 2 via the first organic compound. The second organic compound includes: alcohols such as aliphatic alcohols, alicyclic alcohols, aromatic-aliphatic alcohols, and polyhydric alcohols; glycol ethers such as (poly)alkylene glycol monoalkyl ethers and (poly)alkylene glycol monoaryl ethers; glycol esters such as (poly)alkylene glycol acetates; glycol ether esters such as (poly)alkylene glycol monoalkyl ether acetates; hydrocarbons such as aliphatic hydrocarbons and aromatic hydrocarbons; esters; ethers such as tetrahydrofuran and diethyl ether; and amides such as dimethylformamide (DMF), dimethylacetamide (DMAC), and N-methyl-2-pyrrolidone (NMP). Two or more types of the second organic compound may be used in combination.

Examples of the aliphatic alcohols include: heptanol; octanols such as 1-octanol, 2-octanol, and terpineol; decanols such as 1-decanol; lauryl alcohol; tetradecyl alcohol; cetyl alcohol; 2-ethyl-1-hexanol; octadecyl alcohol; hexadecenol; and oleyl alcohol. A saturated aliphatic alcohol or unsaturated aliphatic alcohol whose carbon number is not smaller than 6 but not larger than 30 is preferable. A saturated aliphatic alcohol or unsaturated aliphatic alcohol whose carbon number is not smaller than 8 but not larger than 24 is particularly preferable.

Examples of the alicyclic alcohols include: cycloalkanols such as cyclohexanol; and terpene alcohols such as terpineol and dihydroterpineol.

Examples of the aromatic-aliphatic alcohols include benzyl alcohol and phenethyl alcohol.

Examples of the polyhydric alcohols include glycols such as ethylene glycol, propylene glycol, diethylene glycol, and dipropylene glycol. An alkylene glycol whose carbon number is not smaller than 2 but not larger than 4 is preferable. An alcohol having 3 or more hydroxyl groups, such as glycerin, is also preferable.

Examples of the (poly)alkylene glycol monoalkyl ethers include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, propylene glycol monomethyl ether, dipropylene glycol monomethyl ether, and tripropylene glycol butyl ether. Examples of the (poly)alkylene glycol monoaryl ethers include 2-phenoxyethanol.

Examples of the (poly)alkylene glycol acetates include carbitol acetate.

Examples of the (poly)alkylene glycol monoalkyl ether acetates include ethylene glycol monoethyl ether acetate, ethylene glycol monomethyl ether acetate, diethylene glycol monobutyl ether acetate, diethylene glycol monoethyl ether acetate, and propylene glycol monomethyl ether acetate.

Saturated aliphatic hydrocarbons and unsaturated aliphatic hydrocarbons, which include tetradecane, octadecane, heptamethylnonane, and tetramethylpentadecane, can be used as the aliphatic hydrocarbons.

Examples of the aromatic hydrocarbons include toluene and xylene.

Examples of the esters include benzyl acetate, isoborneol acetate, methyl benzoate, and ethyl benzoate.

The silver particle 2 is placed in a centrifuge. The excessive second organic compound is removed from the silver particle 2 using the centrifuge. The second organic compound that has not been removed forms the coating layer 4 shown in FIG. 1. Drying of the composition is not necessary after the removal using the centrifuge. By not performing the drying, a wet state is maintained for the composition. If necessary, the composition may be dried appropriately.

As described above, a solvent and the like is added to the composition to obtain a conductive paste. The organic compound exemplified above in relation to the second organic compound can be used as the solvent. A high quality paste can be obtained by using a solvent that has high affinity with the second organic compound. From a standpoint of quality, preferably, the second organic compound is appropriately selected by taking into consideration a property of the solvent that is to be used in the conductive paste. The same solvent as the second organic compound may be added.

For the composition, a particle consisting of metal other than silver may be used. Examples of the metals other than silver include gold, copper, zinc oxide, and titanium oxide.

EXAMPLES

In the following, an advantageous effect of the present invention will be made clear by using Examples; however, the present invention should not be restrictively interpreted based on the descriptions of the Examples.

Example 1

2.8 g of silver oxalate powder was added to 300 cm$^3$ of distilled water. The silver oxalate powder was dispersed in the distilled water by conducting an ultrasonic-wave treatment for 10 minutes. This dispersion liquid was heated to 130° C. and was allowed to react for 15 minutes to obtain a precipitate. This precipitate was taken out, and water was removed therefrom using a centrifuge. The precipitate was added to methanol, and an obtained mixture was agitated. A resultant precipitate was taken out, and methanol was removed therefrom using the centrifuge. The precipitate was added to ethylene glycol monoethyl ether acetate (ECA), and an obtained mixture was agitated. A resultant precipitate was taken out, and excessive ethylene glycol monoethyl ether acetate was removed therefrom using the centrifuge. The precipitate was heat-dried for a predetermined time period to obtain a fine silver particle-containing composition shown in FIG. 1. The composition includes a silver particle and a coating layer. The silver particle has scale-like shape. A particle diameter of the silver particle is about 1 μm. The composition includes 97.9% by weight of the silver particles and 2.04% by weight of the ethylene glycol monoethyl ether acetate. The composition is in a cake form.

Examples 2-3 and Comparative Examples 1-2

Fine silver particle-containing compositions of Examples 2-3 and Comparative Examples 1-2 were obtained in a same manner as Example 1, except for changing the time used for centrifugal separation. The amount of 2-ethoxyethyl acetate in each of the compositions is shown in the following Table 1.

Reference Example

Silver particles in a powder form were prepared.

Examples 4-6 and Comparative Examples 3-4

Fine silver particle-containing compositions of Examples 4-6 and Comparative Examples 3-4 were obtained in a manner same as Example 1, except for changing ethylene glycol monoethyl ether acetate (ECA) to carbitol acetate (CA), changing the time used for centrifugal separation, and using an amount of carbitol acetate (CA) shown in the following Table 2 for each of the compositions.

Examples 7-9 and Comparative Examples 5-6

Fine silver particle-containing compositions of Examples 7-9 and Comparative Examples 5-6 were obtained in a manner same as Example 1, except for changing ethylene glycol monoethyl ether acetate (ECA) to methanol, changing the time used for centrifugal separation, and using an amount of methanol shown in the following Table 3 for each of the compositions.

Examples 10-12 and Comparative Examples 7-8

Fine silver particle-containing compositions of Examples 10-12 and Comparative Examples 7-8 were obtained in a manner same as Example 1, except for changing ethylene glycol monoethyl ether acetate (ECA) to dipropylene glycol methyl ether (DPGME), changing the time used for centrifugal separation, and using an amount of dipropylene glycol methyl ether (DPGME) shown in the following Table 4 for each of the compositions. The compositions of Example 12 and Comparative Example 8 are in a paste form.

Examples 13-15 and Comparative Examples 9-10

Fine silver particle-containing compositions of Examples 13-15 and Comparative Examples 9-10 were obtained in a manner same as Example 1, except for changing ethylene glycol monoethyl ether acetate (ECA) to N-methyl-2-pyrrolidone (NMP), changing the time used for centrifugal separation, and using an amount of N-methyl-2-pyrrolidone (NMP) shown in the following Table 5 for each of the compositions. Each of the compositions of Examples 13-15 and Comparative Example 10 is in a paste form.

Examples 16-18 and Comparative Examples 11-12

Fine silver particle-containing compositions of Examples 16-18 and Comparative Examples 11-12 were obtained in a manner same as Example 1, except for changing ethylene glycol monoethyl ether acetate (ECA) to terpineol, changing the time used for centrifugal separation, and using an amount of terpineol shown in the following Table 6 for each of the compositions.

Examples 19-21 and Comparative Examples 13-14

Fine silver particle-containing compositions of Examples 19-21 and Comparative Examples 13-14 were obtained in a manner same as Example 1, except for changing ethylene glycol monoethyl ether acetate (ECA) to isopropyl alcohol (IPA), changing the time used for centrifugal separation, and using an amount of isopropyl alcohol (IPA) shown in the following Table 7 for each of the compositions.

Examples 22-24 and Comparative Examples 15-16

Fine silver particle-containing compositions of Examples 22-24 and Comparative Examples 15-16 were obtained in a manner same as Example 1, except for changing ethylene glycol monoethyl ether acetate (ECA) to ethylene glycol monophenyl ether, changing the time used for centrifugal separation, and using an amount of ethylene glycol monophenyl ether shown in Table 8 for each of the compositions.

Evaluation of Conductivity

A solvent, a binder, and a dispersant were added to the fine silver particle-containing compositions, and obtained mixtures were agitated to obtain conductive pastes. Wirings were printed using these conductive pastes. Then the wirings were sintered. Electrical conductivities of these wirings were measured. The results are shown as indices in the following Table 1 to Table 8.

TABLE 1

| | Evaluation Result | | | | | |
|---|---|---|---|---|---|---|
| | Ref. Ex. | Comp. Ex. 1 | Ex. 1 | Ex. 2 | Ex. 3 | Comp. Ex. 2 |
| State | Powder | Cake | Cake | Cake | Cake | Cake |
| Amount of ECA (% by weight) | 0 | 1.12 | 2.04 | 6.41 | 14.8 | 16.0 |

TABLE 1-continued

Evaluation Result

|  | Ref. Ex. | Comp. Ex. 1 | Ex. 1 | Ex. 2 | Ex. 3 | Comp. Ex. 2 |
|---|---|---|---|---|---|---|
| Conductivity (index) | 1.00 | 1.02 | 1.31 | 1.29 | 1.26 | 1.03 |

TABLE 2

Evaluation Result

|  | Comp. Ex. 3 | Ex. 4 | Ex. 5 | Ex. 6 | Comp. Ex. 4 |
|---|---|---|---|---|---|
| State | CAKE | CAKE | CAKE | CAKE | CAKE |
| Amount of CA (% by weight) | 1.13 | 2.12 | 7.20 | 15.0 | 16.3 |
| Conductivity (index) | 1.05 | 1.41 | 1.23 | 1.21 | 1.05 |

TABLE 3

Evaluation Result

|  | Comp. Ex. 5 | Ex. 7 | Ex. 8 | Ex. 9 | Comp. Ex. 6 |
|---|---|---|---|---|---|
| State | CAKE | CAKE | CAKE | CAKE | CAKE |
| Amount of methanol (% by weight) | 1.46 | 2.23 | 6.50 | 14.9 | 15.3 |
| Conductivity (index) | 1.03 | 1.23 | 1.21 | 1.20 | 1.05 |

TABLE 4

Evaluation Result

|  | Comp. Ex. 7 | Ex. 10 | Ex. 11 | Ex. 12 | Comp. Ex. 8 |
|---|---|---|---|---|---|
| State | CAKE | CAKE | CAKE | PASTE | PASTE |
| Amount of DPGME (% by weight) | 1.31 | 2.13 | 7.41 | 14.8 | 15.9 |
| Conductivity (index) | 1.08 | 1.30 | 1.25 | 1.21 | 1.02 |

TABLE 5

Evaluation Result

|  | Comp. Ex. 9 | Ex. 13 | Ex. 14 | Ex. 15 | Comp. Ex. 10 |
|---|---|---|---|---|---|
| State | CAKE | PASTE | PASTE | PASTE | PASTE |
| Amount of NMP (% by weight) | 1.12 | 2.04 | 6.41 | 14.8 | 15.7 |
| Conductivity (index) | 1.01 | 1.29 | 1.20 | 1.19 | 1.06 |

TABLE 6

Evaluation Result

|  | Comp. Ex. 11 | Ex. 16 | Ex. 17 | Ex. 18 | Comp. Ex. 12 |
|---|---|---|---|---|---|
| State | CAKE | CAKE | CAKE | CAKE | CAKE |
| Amount of terpineol (% by weight) | 1.12 | 2.04 | 6.41 | 14.8 | 15.7 |
| Conductivity (index) | 1.03 | 1.40 | 1.32 | 1.29 | 1.02 |

TABLE 7

Evaluation Result

|  | Comp. Ex. 13 | Ex. 19 | Ex. 20 | Ex. 21 | Comp. Ex. 14 |
|---|---|---|---|---|---|
| State | CAKE | CAKE | CAKE | CAKE | CAKE |
| Amount of IPA (% by weight) | 1.12 | 2.04 | 6.41 | 14.8 | 15.7 |
| Conductivity (index) | 1.01 | 1.35 | 1.25 | 1.23 | 1.06 |

TABLE 8

Evaluation Result

|  | Comp. Ex. 15 | Ex. 22 | Ex. 23 | Ex. 24 | Comp. Ex. 16 |
|---|---|---|---|---|---|
| State | CAKE | CAKE | CAKE | CAKE | CAKE |
| Amount of ethylene glycol monophenyl ether (% by weight) | 1.12 | 2.04 | 6.41 | 14.8 | 15.9 |
| Conductivity (index) | 1.05 | 1.30 | 1.23 | 1.21 | 1.03 |

As shown in Table 1 to Table 8, the wirings obtained from the fine silver particle-containing compositions of the Examples have excellent conductivity. This is a result of having less aggregation of the silver particles. The advantage of the present invention is obvious from these evaluation results.

INDUSTRIAL APPLICABILITY

The fine metal particle-containing composition according to the present invention can be utilized in use applications such as a paste for printed circuits, a paste for electromagnetic wave shielding films, a paste for electroconductive adhesives, a paste for die bonding, and the like.

DESCRIPTION OF THE REFERENCE CHARACTERS

2 . . . silver particle
4 . . . coating layer

The invention claimed is:
1. A fine silver particle-containing composition comprising a large number of fine silver particles having a scale-like shape, and an organic compound that coats a surface of each particle, wherein a weight ratio of the organic compound with regard to a total amount of the composition is not lower than 2% but not higher than 15%, said organic compound including a first organic compound chemically bonded to a surface of the silver particle, and a second organic compound physically bonded to the first organic compound on the silver particle by surface tension, wherein said second organic compound is at least one selected from the group consisting of ethylene glycol monoethyl ether acetate, carbitol acetate, methanol, dipropylene glycol methyl ether, N-methyl-2-pyrrolidone, terpineol, isopropyl alcohol and ethylene glycol monophenyl ether, wherein said silver particle is a precipitate obtained by dispersing a silver compound in a carrier selected from the group consisting of water and an alcohol to form a dispersion and heating the dispersion.

2. The composition of claim 1, wherein said fine metal particles have a particle size not smaller than 200 nm.

3. The composition of claim 1, wherein said fine metal particles having the scale-like shape being a thin flat or flake shape.

4. The composition of claim 1, wherein said alcohol is selected from the group consisting of ethyl alcohol, methyl alcohol, and propyl alcohol.

5. The composition of claim 1, wherein the silver compound is silver oxalate.

\* \* \* \* \*